US006231195B1

United States Patent
Gutin

(10) Patent No.: US 6,231,195 B1
(45) Date of Patent: May 15, 2001

(54) LARGE-APERTURE, DIGITAL MICROMIRROR ARRAY-BASED IMAGING SYSTEM

(75) Inventor: Mikhail A. Gutin, Albany, NY (US)

(73) Assignee: InterScience, Inc., Troy, NY (US)

( * ) Notice: Subject to any disclaimer, the term of this patent is extended or adjusted under 35 U.S.C. 154(b) by 0 days.

(21) Appl. No.: 09/574,943

(22) Filed: May 19, 2000

Related U.S. Application Data

(60) Provisional application No. 60/135,068, filed on May 20, 1999.

(51) Int. Cl.[7] .................................................. G02B 27/00
(52) U.S. Cl. ......................... 359/614; 359/603; 359/884
(58) Field of Search .................. 359/614, 615, 359/586, 587, 589, 603, 884

(56) References Cited

U.S. PATENT DOCUMENTS

| | | |
|---|---|---|
| 4,441,791 | 4/1984 | Hornbeck . |
| 4,541,697 * | 9/1985 | Remijan ................................ 351/211 |
| 4,542,989 * | 9/1985 | Remijan ................................ 356/373 |
| 4,896,606 * | 1/1990 | De Coi .................................. 102/213 |
| 5,028,939 | 7/1991 | Hornbeck, et al. . |
| 5,105,207 | 4/1992 | Nelson . |
| 5,159,485 | 10/1992 | Nelson . |
| 5,969,876 | 10/1999 | Moskovich . |

OTHER PUBLICATIONS

Feather. Micromirrors and Digital Processing, Photonics Spectra, May 1995, 118–124.

Knipe. Challenges of a Digital Micromirror Device: modeling and design. SPIE vol. 2783, Mar. 1996, 135–145.

Kearney and Ninkow. Characterization of a digital micromirror device for use as an optical mask in imaging and spectroscopy. SPIE vol. 3292, 1998, 81–92.

Hornbeck. A Digital Light Processing Update –status and future applications. SPIE vol. 3634, 1999, 158–170.

* cited by examiner

Primary Examiner—Mohammad Y. Sikder
(74) Attorney, Agent, or Firm—Jay R. Yablon

(57) ABSTRACT

An apparatus and method disclosed herein can be utilized in all DMA-based optical systems, such as imaging and projection devices, in order to improve light efficiency and brightness by a significant factor and maintain good contrast. This feature is especially important in night vision systems and other low light applications. A means is provided of masking a designated area of light collected by the system objective lens in order to eliminate light collected from "flat" or "off" state micromirrors that would degrade the image quality produced. The masked objective lens, with a larger aperture, enhances the light collection from micromirrors in the "on" state only.

30 Claims, 5 Drawing Sheets

LARGE-APERTURE, DIGITAL MICROMIRROR ARRAY-BASED IMAGING SYSTEM

CROSS-REFERENCE TO RELATED APPLICATIONS

This application claims the benefit of U.S. Provisional application Ser. No. 60/135,068, filed May 20, 1999.

FIELD OF THE INVENTION

This invention relates to the field of optical systems, particularly imaging and projection systems utilizing digital micromirror arrays, and particularly to improving the light throughput and/or efficiency of such DMA-based optical systems.

BACKGROUND OF THE INVENTION

Digital Micromirror Array (DMA) technology comprises an array of individual moveable micromirrors over memory cells of a CMOS static RAM, for example the digital micromirror device (DMD) produced by Texas instruments. Electrostatic forces based on the data in each memory cell tilt each individual micromirror on torsional hinges, typically by and angle of ±10 degrees from the plane of the overall DMA. The individual micromirrors are switched between the "on" and "off" state, while DMA components other than the mirrors can be found in a "flat" orientation with no tilt.

In DMA-based optical systems and devices (e.g., light projectors) the ±10 degrees (total 20°) tilt of the micromirrors is the factor limiting the maximum aperture of the objective lens projecting the light reflected from the DMA surface and imaging it on a screen. According to the prior art shown in FIG. 1, incident light 100 is passed through an illuminating lens 103 and focused on a digital micromirror array (DMA) 102. It is then reflected depending on the positions of the micromirrors.

Normally, desired light reflected from micromirrors in the "on" position, i.e., the "on" reflected light cone 104, is collected by an objective lens 106. The maximum vertex (and consequent width) of the "on" reflected light cone 104, corresponds to the objective lens 106 aperture, which is typically F/2.8. It is noted that the F/# is an optical term known in the art and defined as the focal length of the lens divided by the diameter of the lens. The "speed" of a given lens refers to the F/#. In general, the "faster" the lens, the lower the F/#.

Similarly, undesired light reflected away from the objective lens 106 from micromirrors in the "off" position, forms the "off" reflected light cone 110. Undesired light reflected by "flat" components of the DMA (i.e., those components of the DMA other than the "on" and "off" micromirrors) form the "flat" reflected light cone 108. These undesired "flat" and "off" light cones 108 and 110 are diverted away from objective lens 106 to a light absorber 112. FIG. 1 shows the illuminating light 100 and all possible reflected light cones (104, 110, 108) based on the mirrors in the on and off positions, as well as contributed by reflections from flat components of the DMA.

Prior art imaging systems such as illustrated in FIG. 1 typically are optimized for a standard 10° tilt of the micromirror by using an objective lens 106 with an aperture of F/2.8 since at this aperture the objective lens 106 collects only the "on" reflected light cone 104 and there is no overlap with undesired light in either the "flat" or "off" light cones.

It is to be noted that FIG. 1 is a schematic representation insofar as the light cone vertex angles are illustrated to be larger than 20° simply to facilitate drawing clarity and emphasis. In reality, these vertex angles are in fact approximately 20°. Each light cone then emerges tilted from the adjacent light cone by approximately 20° so that the light cones emanate from DMA 102 as closely as possible to one another without overlap, as shown. Thus, there is a 20° rotation of the "flat" light cone relative to its adjacent "on" light cone, and further of the "off" light cone relative to its adjacent "flat" light cone.

To understand this fully, it is important to note that for a given degree of tilt of one mirror relative to another, the reflected light beams from a common incident light source will differ in angle from one another by twice this degree of tilt (i.e., the reflection angle is doubled), as can be seen by considering basic optical principles of light reflection. The 20° vertex of each light cone results from choosing illuminating lens 103 so as to focus the incident light 100 on DMA 102 with a similar 20° vertex; the 20° tilting of each light cone relative to its adjacent cone results from the 10° difference between the "on" micromirrors and the "flat" DMA components, and between the "flat" DMA components and the "off" micromirrors, which difference becomes doubled upon the reflection of the incident light 100.

Therefore, typical prior art DMA-based systems, with a representative 10° micromirror tilt producing a 20° angular reflection between adjacent light cones, are limited to using an objective lens aperture no better than F/2.8. Using a faster lens with a larger aperture in combination with using a wider vertex angle for all of the reflected light cones would produce overlap between the light cones, and thereby degrade the image produced since the lens would capture light from the undesired light cones and the resultant image would include artifacts from the undesired overlapping light cones. The prior art is thus lacking a means of benefiting from the use of an objective lens faster and wider than that which corresponds to no overlap between reflected light cones, without introducing image degrading artifacts that essentially negate the improvements normally gained by increasing the lens aperture in a projection system.

More generally, a micromirror 102 with any given degree of tilt imposes a corresponding limiting objective lens 106 aperture based on the requirement that the undesired "flat" 108 and "off" 110 reflected light cones do not overlap with the desired "on" reflected light cone 104, since the latter fills the area collected by objective lens 106.

OBJECTS OF THE INVENTION

It is therefore desirable to provide an improved DMA-based imaging or projection system than can use a larger aperture objective lens without the negative limitations found in the prior art.

It is also desirable to provide an improved DMA-based imaging or projection system for enhanced light efficiency.

SUMMARY OF THE INVENTION

Several embodiments of the invention disclosed and claimed herein comprise a light-absorbing mask preventing light from at least one overlap region where a desired light cone intersects with at least one undesired light cone from passing through an objective lens of an optical system. These embodiments also further allow substantially all remaining light from the desired light cone which does not intersect with any of the undesired light cones to pass through the objective lens. By eliminating light collected from "off" state micromirrors and from flat components of the DMA, degradation of image quality is avoided. Further, the masked objective lens, with a larger aperture, enhances the light collection from the desired light cone.

These and equivalent embodiments of the present invention can be utilized in all DMA-based optical systems, including imaging and projection devices, in order to improve light throughput and system efficiency by a significant factor. This feature is especially important in night vision systems and other low light applications. It is also of value in light projectors and other DMA-based imaging devices.

DETAILED DESCRIPTION OF THE DRAWINGS

The features of the invention believed to be novel are set forth in the associated claims. The invention, however, together with further objects and advantages thereof, may best be understood by reference to the following description taken in conjunction with the accompanying drawings in which:

DETAILED DESCRIPTION

Figure 1:
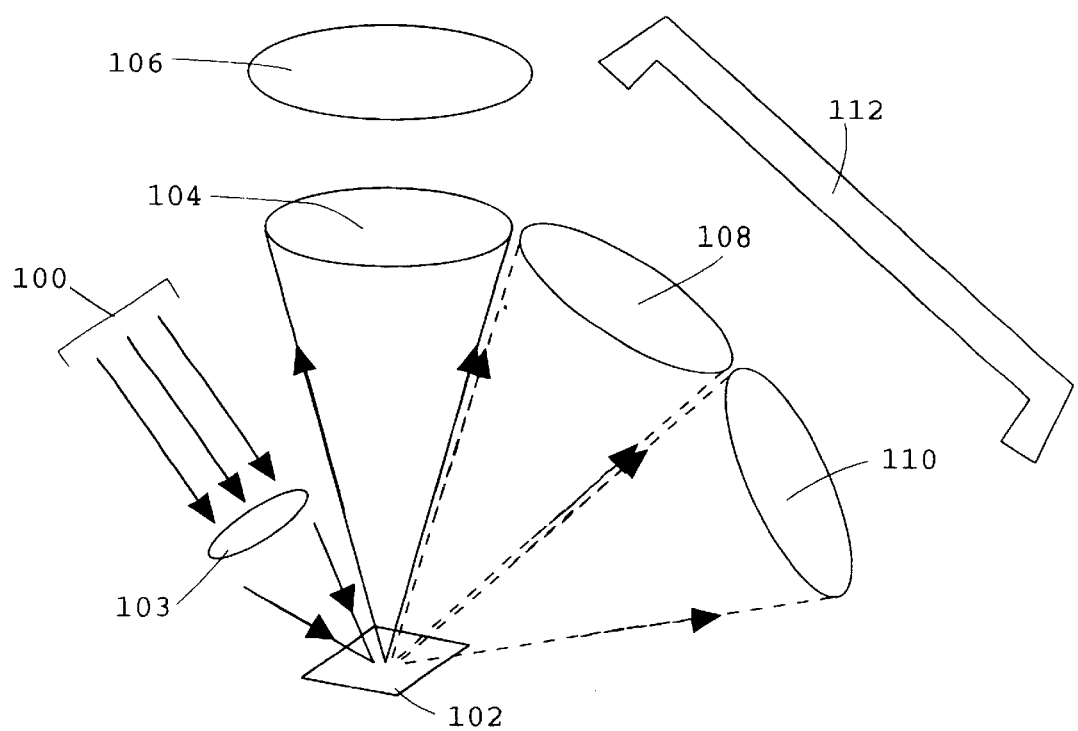
FIG. 1 is a schematic operational diagram illustrating the prior art and its limitations.

Several embodiments of the invention disclosed herein improve light throughput in a DMA-based imaging or projection system. In general, by using a faster lens in an imaging system, the extra area of the lens aperture provides higher light throughput and an increase in system efficiency. However, in the prior art DMA-based imaging system such as shown in FIG. 1, the usable aperture of objective lens 106 is limited by the tilt angle of digital micromirror array (DMA) 102. This tilt angle typically is ±10°, but is not necessarily limited to ±10° within the scope of this disclosure and its associated claims.

In particular, illuminating light 100 is directed towards DMA 102. The vertex angle that the illuminating light makes at DMA 102 (which is subsequently the vertex angle of all the reflected light cones 104, 108, 110) is defined by the optical properties of illuminating lens 103. The limitations imposed by the prior art—namely no overlap between reflected light cones—limits the vertex angle to 20° for a ±10° tilt of micromirror 102.

Figure 2:
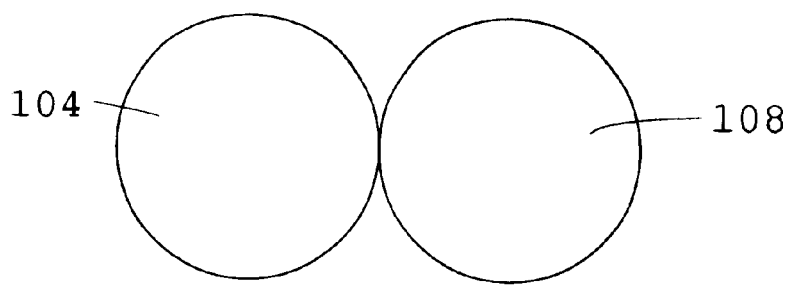
FIG. 2 is a top view of these prior art limitations.

In addition to the vertex angles of the reflected light cones being limited to 20°, the angular deflections between the adjacent light cones are also 20°. This standard 20° angular deflection between the "on" reflected light cone 104 and the "flat" reflected light cone 108 limits the objective lens 106 aperture that is imaging the "on" reflected light cone 104 to F/2.8 in order to prevent any overlap of the "flat" reflected light cone 108 with the "on" reflected light cone 104, the latter of which is collected by the objective lens 106. This is represented in FIG. 2, which shows the top view of the "on" reflected light cone and the adjacent "flat" reflected light cone 108.

Figure 3:
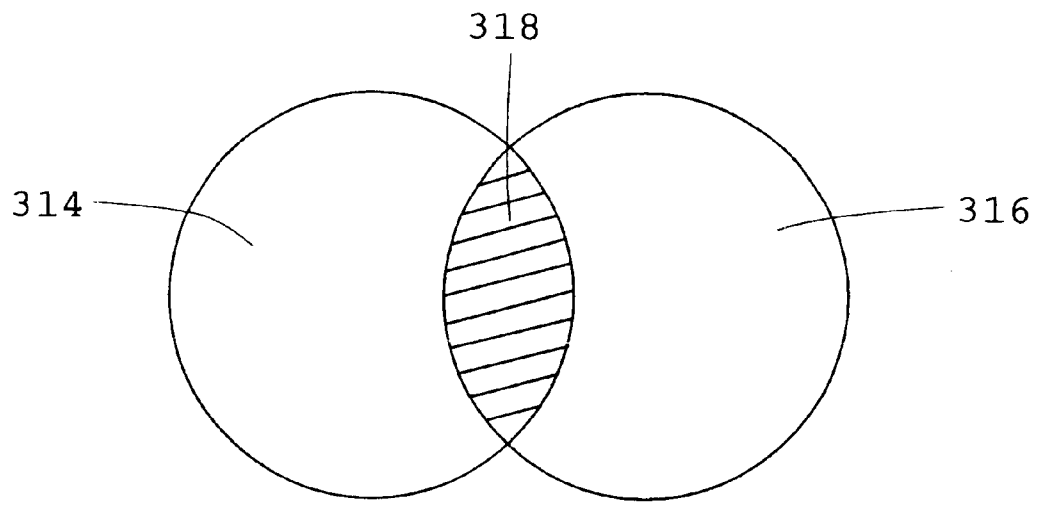
FIG. 3 is a top view showing the overlap resulting from using a faster objective lens and a wider light cone vertex.
Figure 4:
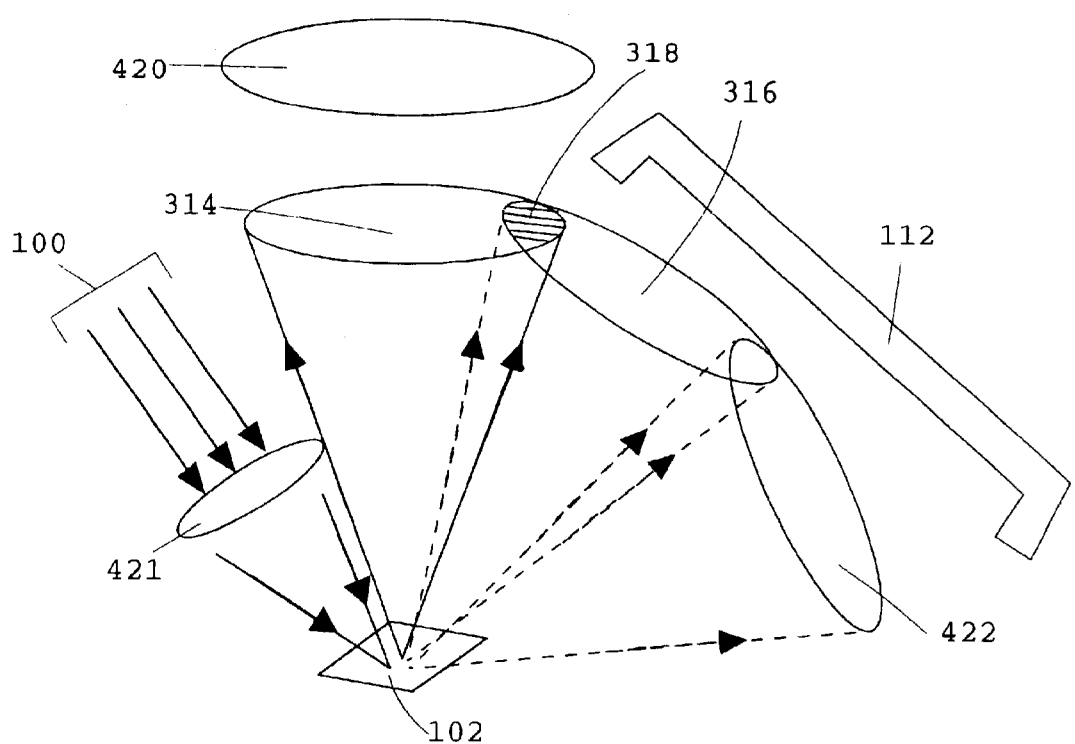
FIG. 4 is a schematic operational diagram illustrating use of a faster objective lens in a DMA-based imaging system.

In the prior art configuration using a ±10° micromirror tilt, if an objective lens faster than the F/2.8 is used, which by definition increases the aperture of the objective lens and thereby allows the use of a faster illuminating lens, and if illuminating lens 103 is now chosen to focus the incident light 100 on DMA 102 with a vertex greater than 20° so as to make use of the extra area of this faster illuminating lens 103, this will cause the reflected light cones 104, 108, and 110 to emerge from DMA 102 with a vertex angle greater than 20° as well. But, as shown in FIGS. 3 and 4, the enlarged undesired light cone 316 corresponding to the "flat" DMA components will overlap (intersect) with the enlarged "on" light cone 314. The overlap light 318 will then pass through the widened objective lens aperture, thus making "flat" DMA components visible, and reducing the contrast and degrading the transmitted image quality.

Making use of the configuration of FIG. 4, the present invention provides a means of achieving increased light throughput by using a faster objective lens 420 with a larger aperture diameter without the negative aspects of the image degradation typically caused by the overlapping light cones. A faster, wider objective lens 420 is used in a DMA-based imaging system similarly to FIG. 1. Illuminating light 100 is directed towards micromirror 102 through faster illuminating lens 421 producing a larger vertex angle for all reflected light cones. Faster illuminating lens 421 is distinguished from original illuminating lens 103 because it focuses illuminating light 100 on DMA 102 with a vertex angle larger than the angle of relative tilt between the "on" and "off" micromirrors.

Similar to the prior art, illuminating light 100 is reflected by DMA 102. The "on" state micromirrors produce enlarged desired "on" light cone 314, the "flat" DMA components producing enlarged undesired "flat" light cone 316, and the "off" state micromirrors produce enlarged undesired "off" light cone 422. Since the aperture of faster illuminating lens 421 focuses illuminating light 100 on DMA 102 with a vertex angle larger than the angle of relative tilt between the "on" and "off" micromirrors, while the angular tilt of the micromirrors comprising DMA 102 is fixed and remains constant, the vertex angle and width of all of the enlarged reflected light cones (314, 316, and 422) also increases. This increase in the vertex angles and widths of enlarged light cones 314, 316, and 422 produces overlap light region 318 wherein light from "on" light cone 314 and "flat" light cone 316 overlap, and allows for the use of faster objective lens 420 to collect the entire enlarged "on" light cone 314 including overlap region 318, and thereby increase the optical efficiency of the system. Without more, however, this overlap light region 318 will also enter the increased aperture of faster objective lens 420, localized on one side of this aperture. And this will cause image degradation.

Figure 5:
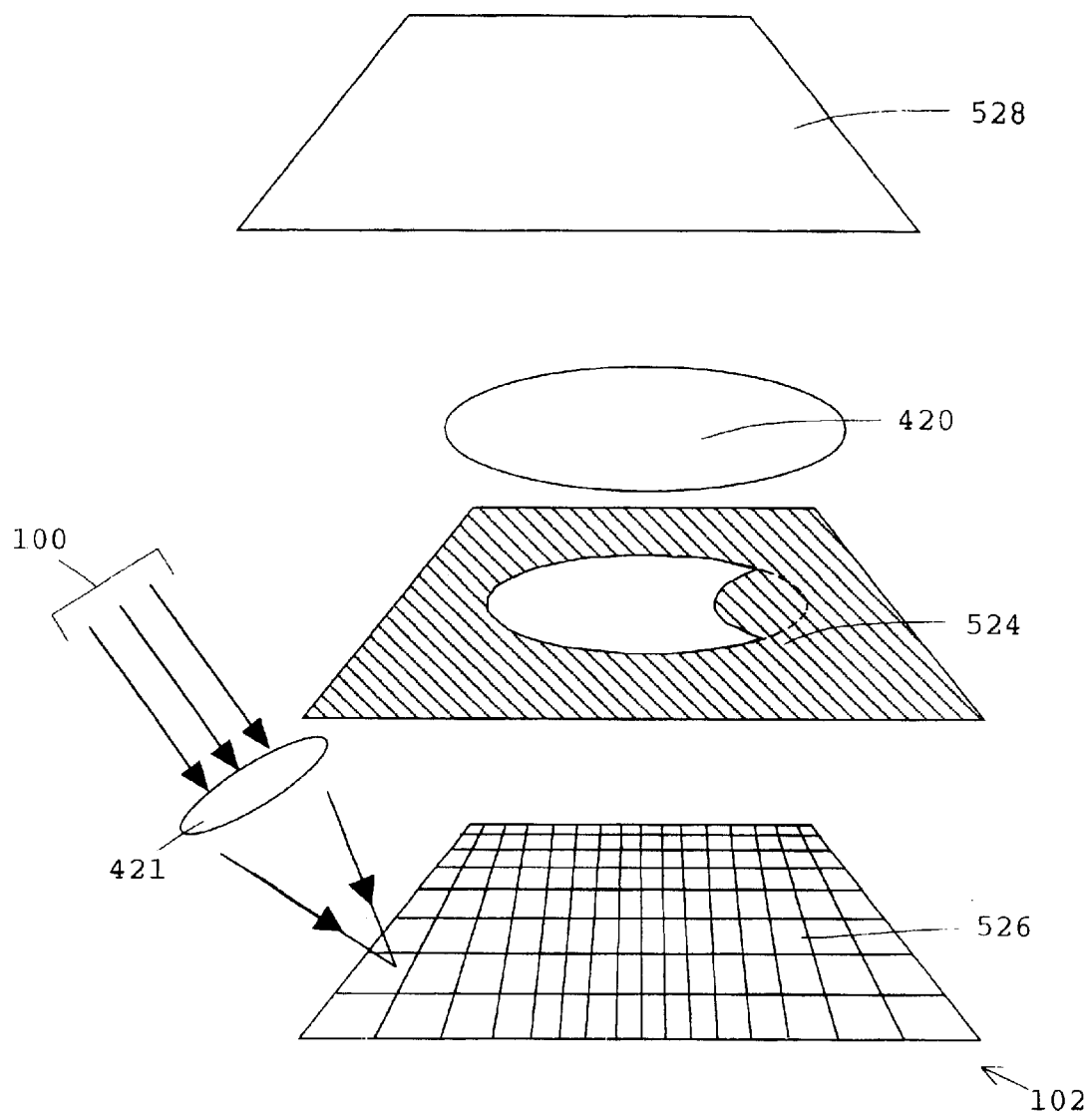
FIG. 5 is an exploded view of the components of the an imaging system according to a preferred embodiment of the invention which masks undesired light while enabling use of a wider objective lens to receive desired light.

Therefore, a preferred embodiment, starting with the configuration of FIG. 4, uses a light-absorbing mask 524 shown in FIG. 5 to mask the light from overlap region 318 while leaving unobstructed (transparent) the rest of the extra area of the faster objective lens 420 to increase the light throughput. This embodiment comprises placing a light-absorbing mask 524 in front of the faster objective lens 420, shaped as the cross-section of the overlap light between "on" and "flat" light cones, 314 and 316 respectively. As shown in the FIGS. 4 and 5 taken together, illuminating light 100 illuminates DMA 102 using faster illuminating lens 421. The reflected light collected by the aperture of faster objective lens 420 is masked by light absorbing mask 524 in order to maximize light throughput from enlarged "on" light cone 314 to image plane 528 while obstructing light from overlap region overlap light region 318, to maintain image contrast. The aperture of faster objective lens 420, which is larger than that of original objective lens 106, can thus be used without transmitting the overlap light 318 that would degrade the image.

While some light from enlarged "on" light cone 314 is lost on mask 524, the overall light throughput nevertheless is significantly better than that obtained with original objective lens 106. Importantly, no image information is lost due to the region of mask 524 that blocks the overlap light 318, because 100% of the "on" micromirror array elements 526 of DMA 102 are imaged through faster objective lens 420. The effect of mask 524 is that the overall intensity from each micromirror array element 526 is reduced. However, even with this reduced intensity, a significant improvement is obtained over the intensity achieved using original objective lens 106.

Figure 6:
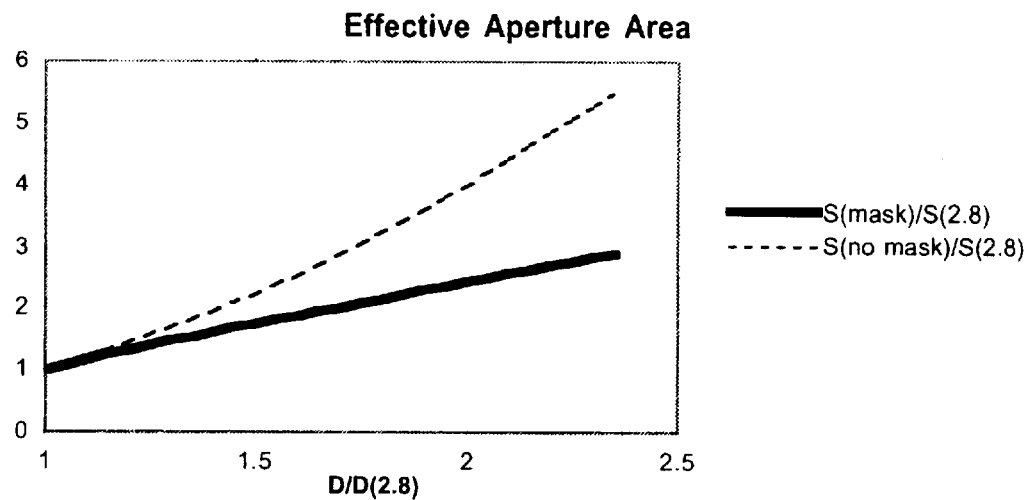
FIG. 6 is a graph illustrating the enhanced light throughput resulting from this preferred embodiment.

FIG. 6 demonstrates this overall improvement in light throughput. Even though some "on" light 314 to faster objective lens 420 is masked (namely that "on" light in the overlap region 318) thereby slightly reducing the aperture area, the useable effective aperture area of the masked faster objective lens 420 is still greater than the effective aperture area of the original objective lens 106. The useable aperture area, S, of the faster objective lens 420 is defined by the following equation and is what is represented on the y-axis of the graph in FIG. 6:

$$S = \left(\frac{D}{2}\right)^2 \left[\pi - 2\arccos\left(\frac{D}{D_o}\right) + \sin\left(2\arccos\left(\frac{D}{D_o}\right)\right)\right]$$

wherein:
S=effective aperture area
D=diameter of faster objective lens 420
$D_o$=diameter of original (slower) objective lens 106

For example, referencing the graph in FIG. 6, the original objective lens 106 is designated to have an aperture of F/2.8, while the faster objective lens 420 is designated to have an aperture of F/1.4 and faster. One can see in the FIG. 6 graph that if simply instead of the 2.8 lens a 1.4 lens is used ($D/D_o=2$), the light throughput can be approximately 4 times higher than with the 2.8 lens, since a 1.4 lens has twice the diameter of a 2.8 lens and since area of the lens varies with the square of diameter. This relationship is designated by the dotted line defined as S(no mask)/S(2.8), and is, in essence, based on the simple polynomial $y=x^2$. However, this improvement contains the image anomalies and reduced contrast that needs to be avoided. Therefore, if a masked 1.4 lens is compared to an unmasked 2.8 lens and graphed for effective aperture area, an improvement of 2.5 is still seen. This relationship is shown by the heavy line defined as S(mask)/S(2.8). Thus, the full 4-fold improvement is based on lens area alone is not obtained, but a substantial 2.5-fold improvement is obtained.

Figure 7:
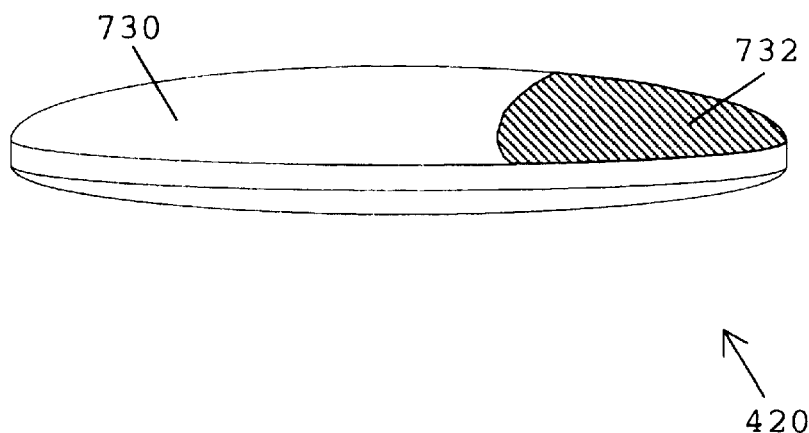
FIG. 7 illustrates an objective lens that comprises a light mask directly thereon, for use in an alternative preferred embodiment of the invention.

An alternative preferred embodiment regards the placement of mask 524 in the DMA-based optical system. Although the preferred embodiment presented above provides the most logical system orientation, one could also place the light absorbing mask 524 directly on the faster objective lens 420, for example, by manufacturing the mask directly onto (i.e., integral with) the lens. FIG. 7 illustrates such a lens, which comprises a transparent region 730 in the usual manner allowing light to flow therethrough, as well as an opaque region 732 which blocks light from overlap region 318 from ever reaching imaging plane 528. The function and operation here is identical to that described in the preferred embodiment above in all other respects.

It is to be noted that any mask placement relative to objective lens 420 that serves to filter overlap region 318 while allowing the remaining light from "on" light cone 314 to pass through objective lens 420 is considered an obvious variation of what has been disclosed above within the scope of this disclosure and its associated claims.

While the above disclosure has illustrated the embodiments of the invention in terms of a ±10° DMA angle tilt, it is understood that the principles outlined herein generalize to any degree of micromirror tilt that might be used now or in the future. Generally, for a ±θ tilt, the adjacent "on" and "flat," and the adjacent "flat" and "off" reflected light cones will be reflected from DMA 102 at an angle of 2θ from one another. The light cone vertices can therefore be as wide as 2θ before any overlap occurs, and suitable embodiments of the invention would therefore involve using light cone vertices of angle V>2θ in connection with a suitable mask for overlap region 318, in order to enable use of an enlarged diameter, faster objective-lens 420. From a side view such as illustrated by FIG. 4, the vertex of overlap region 318 will then transcend an overlap angle φ=V−2θ>0.

Thus, the use of this invention in connection with other tilt angles, for example, between 5 and 15 degrees, and even between as little as 1 and as much as 22.5 degrees, is considered to be within the scope of this disclosure and its associated claims. Note that for a 22.5 degree tilt angle, the "on" and "flat" light cones reflect at a 45 degree difference from one another, and the "on" and "off" light cones will reflect at a 90 degree difference from one another.

While the term "lens" has been used at various points in this disclosure and its associated claims, it is understood that any similar focusing means known to someone of ordinary skill is considered to be within the literal meaning of the term "lens" as used herein, and in any event, is considered to be a lens equivalent.

While only certain preferred features of the invention have been illustrated and described, many modifications, changes and substitutions will occur to those skilled in the art. It is, therefore, to be understood that this disclosure and its associated claims are intended to cover all such modifications and changes as fall within the true spirit of the invention.

I claim:

1. An optical system, comprising:

a light-absorbing mask preventing light from at least one overlap region where a desired light cone intersects with at least one undesired light cone from passing through an objective lens of said optical system, while allowing substantially all remaining light from said desired light cone which does not intersect with any of said undesired light cones to pass through said objective lens.

2. The system of claim 1, wherein:

said desired light cone and said undesired light cones comprise light reflected from a digital micromirror array further comprising a plurality of micromirrors for reflecting incident light into at least two reflected light cones, one of which comprises said desired light cone and all others of which comprise said undesired light cones.

3. The system of claim 2, wherein:
said incident light strikes said digital micromirror array with a vertex angle such that at least one of said undesired light cones overlaps with said desired light cone in said at least one overlap region.

4. The system of claim 1, wherein:
said light-absorbing mask is integral with said objective lens.

5. The system of claim 2, wherein said at least two reflected light cones comprise:
an "on" light cone comprising light reflected by those of said micromirrors in an "on" position;
an "off" light cone comprising light reflected by those of said micromirrors in an "off" position; and
a "flat" light cone comprising light reflected by components of said digital micromirror array other than said "on" and "off" position micromirrors; and wherein:
said at least one overlap region comprises a region wherein said "on" light cone intersects said "flat" light cone.

6. The system of claim 2, wherein said micromirrors are activated into "on" and "off" orientations differing from one another by a tilt angle of $\pm\theta$ from a plane of said digital micromirror array, wherein each of said light cones is thereby reflected off of said digital micromirror array at an angle of $2\theta$ relative to any light cone adjacent thereto, wherein said incident light strikes said digital micromirror array with a vertex angle $V>2\theta$ thereby causing each of said reflected light cones to reflect off of said digital micromirror array with a similar vertex angle $V>2\theta$, and wherein said overlap region thereby transcends an overlap angle $\phi=V-2\theta$.

7. The system of claim 6, wherein said tilt angle $\theta$ is approximately 10 degrees.

8. The system of claim 6, wherein said tilt angle $\theta$ is between approximately 5 and 15 degrees.

9. The system of claim 6, wherein said tilt angle $\theta$ is between approximately 1 and 22.5 degrees.

10. The system of claim 1, said objective lens comprising a faster objective lens, wherein a useable aperture area, S, of said faster objective lens relative that of a slower objective lens thereby varies according to:

$$S = \left(\frac{D}{2}\right)^2 \left[\pi - 2\arccos\left(\frac{D}{D_o}\right) + \sin\left(2\arccos\left(\frac{D}{D_o}\right)\right)\right]$$

wherein
S=effective aperture area
D=diameter of faster objective lens
$D_o$=diameter of slower objective lens.

11. A method for performing optical imaging, comprising the steps of:
preventing light from at least one overlap region where a desired light cone intersects with at least one undesired light cone from passing through an objective lens of an optical system, using a light-absorbing mask; and
allowing substantially all remaining light from said desired light cone which does not intersect with any of said undesired light cones to pass through said objective lens.

12. The method of claim 11, comprising the further step of:
reflecting incident light into at least two reflected light cones, one of which comprises said desired light cone and all others of which comprise said undesired light cones, using a digital micromirror array further comprising a plurality of micromirrors.

13. The method of claim 12, comprising the further step of:
striking said digital micromirror array with said incident light with a vertex angle such that at least one of said undesired light cones overlaps with said desired light cone in said at least one overlap region.

14. The method of claim 11, comprising the further step of:
providing said light-absorbing mask integrally with said objective lens.

15. The method of claim 12, comprising the further steps of:
reflecting said incident light into an "on" light cone comprising one of said at least two reflected light cones, using those of said micromirrors in an "on" position;
reflecting said incident light into an "off" light cone comprising another one of said at least two reflected light cones, using those of said micromirrors in an "off" position; and
reflecting said incident light into an "flat" light cone comprising another one of said at least two reflected light cones, from components of said digital micromirror array other than said "on" and "of f" position micromirrors; wherein:
said at least one overlap region comprises a region wherein said "on" light cone intersects said "flat" light cone.

16. The method of claim 12, comprising the further steps of:
activating said micromirrors into "on" and "off" orientations differing from one another by a tilt angle of $\pm\theta$ from a plane of said digital micromirror array, thereby reflecting each of said light cones off of said digital micromirror array at an angle of $2\theta$ relative to any light cone adjacent thereto; and
striking said digital micromirror array with said incident light having a vertex angle $V>2\theta$ thereby causing each of said reflected light cones to reflect off of said digital micromirror array with a similar vertex angle $V>2\theta$, and said overlap region to thereby transcend an overlap angle $\phi=V-2\theta$.

17. The method of claim 16, comprising the further step of employing said tilt angle $\theta$ to be approximately 10 degrees.

18. The method of claim 16, comprising the further step of employing said tilt angle $\theta$ to be between approximately 5 and 15 degrees.

19. The method of claim 16, comprising the further step of employing said tilt angle $\theta$ to be between approximately 1 and 22.5 degrees.

20. The method of claim 11, said objective lens comprising a faster objective lens, comprising the further step of thereby varying a useable aperture area, S, of said faster objective lens relative that of a slower objective lens according to:

$$S = \left(\frac{D}{2}\right)^2 \left[\pi - 2\arccos\left(\frac{D}{D_o}\right) + \sin\left(2\arccos\left(\frac{D}{D_o}\right)\right)\right]$$

wherein
S=effective aperture area
D=diameter of faster objective lens
$D_o$=diameter of slower objective lens.

21. A mask for use in a optical system, said mask comprising:

a light-absorbing region preventing light from at least one overlap region where a desired light cone of said optical system intersects with at least one undesired light cone of said optical system from passing through an objective lens of said optical system; and a transparent region allowing substantially all remaining light from said desired light cone which does not intersect with any of said undesired light cones to pass through said objective lens.

22. The mask of claim 21, wherein:

said desired light cone and said undesired light cones comprise light reflected from a digital micromirror array further comprising a plurality of micromirrors for reflecting incident light into at least two reflected light cones, one of which comprises said desired light cone and all others of which comprise said undesired light cones.

23. The mask of claim 22, wherein:

said incident light strikes said digital micromirror array with a vertex angle such that at least one of said undesired light cones overlaps with said desired light cone in said at least one overlap region.

24. The mask of claim 21 in combination with said objective lens, wherein:

said light-absorbing mask is integral with said objective lens.

25. The mask of claim 22, wherein said at least two reflected light cones comprise:

an "on" light cone comprising light reflected by those of said micromirrors in an "on" position;

an "off" light cone comprising light reflected by those of said micromirrors in an "off" position; and a "flat" light cone comprising light reflected by components of said digital micromirror array other than said "on" and "off" position micromirrors; and wherein:

said at least one overlap region comprises a region wherein said "on" light cone intersects said "flat" light cone.

26. The mask of claim 22, wherein said micromirrors are activated into "on" and "off" orientations differing from one another by a tilt angle of ±θ from a plane of said digital micromirror array, wherein each of said light cones is thereby reflected off of said digital micromirror array at an angle of 2θ relative to any light cone adjacent thereto, wherein said incident light strikes said digital micromirror array with a vertex angle V>2θ thereby causing each of said reflected light cones to reflect off of said digital micromirror array with a similar vertex angle V>2θ, and wherein said overlap region thereby transcends an overlap angle φ=V−2θ.

27. The mask of claim 26, wherein said tilt angle θ is approximately 10 degrees.

28. The mask of claim 26, wherein said tilt angle θ is between approximately 5 and 15 degrees.

29. The mask of claim 26, wherein said tilt angle θ is between approximately 1 and 22.5 degrees.

30. The mask of claim 21, said objective lens comprising a faster objective lens, wherein a useable aperture area, S, of a faster objective lens relative that of a slower objective lens thereby varies according to:

$$S = \left(\frac{D}{2}\right)^2 \left[\pi - 2\arccos\left(\frac{D}{D_o}\right) + \sin\left(2\arccos\left(\frac{D}{D_o}\right)\right)\right]$$

wherein

S=effective aperture area

D=diameter of faster objective lens $D_o$=diameter of slower objective lens.

* * * * *